No. 615,266. Patented Dec. 6, 1898.
T. B. FOGARTY.
APPARATUS FOR MAKING CYANIDS.
(Application filed Dec. 18, 1896.)
(No Model.) 2 Sheets—Sheet 1.
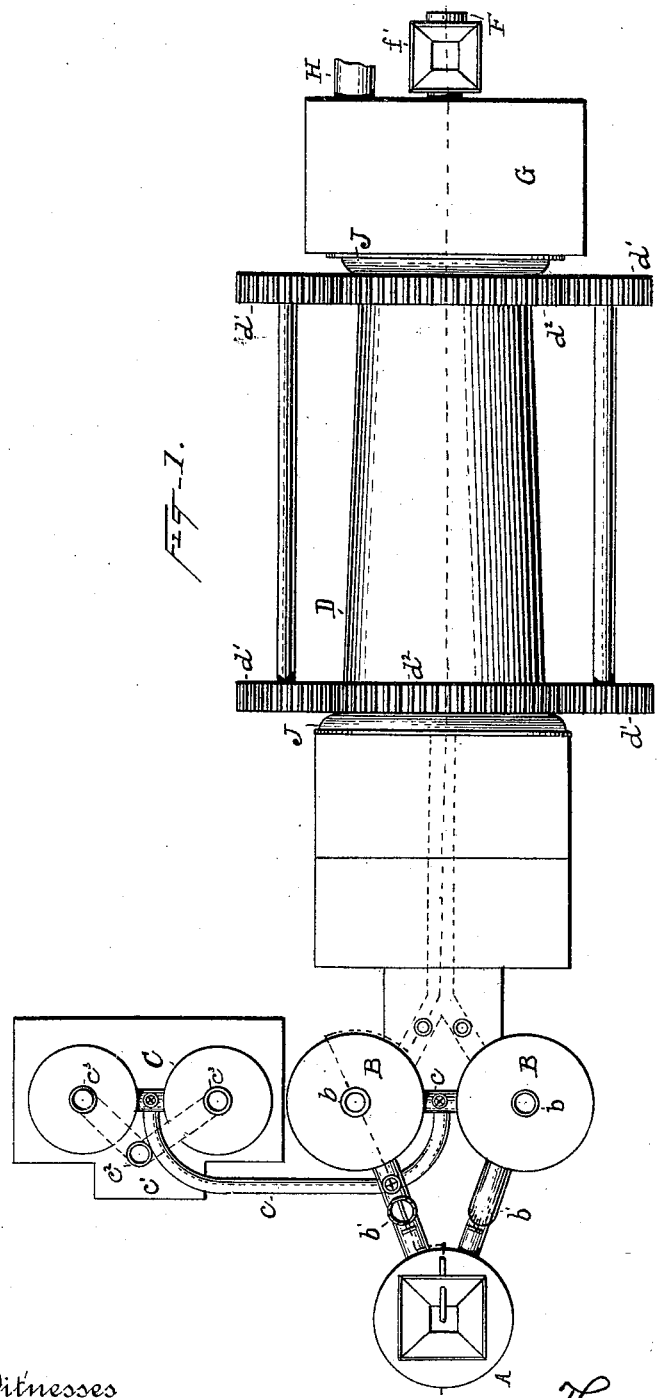
Witnesses
Norris A. Clark.
Jno. R. Taylor.
Inventor
Thomas B. Fogarty
By his Attorneys
Dyer & Driscoll.

No. 615,266. Patented Dec. 6, 1898.
T. B. FOGARTY.
APPARATUS FOR MAKING CYANIDS.
(Application filed Dec. 18, 1896.)
(No Model.) 2 Sheets—Sheet 2.
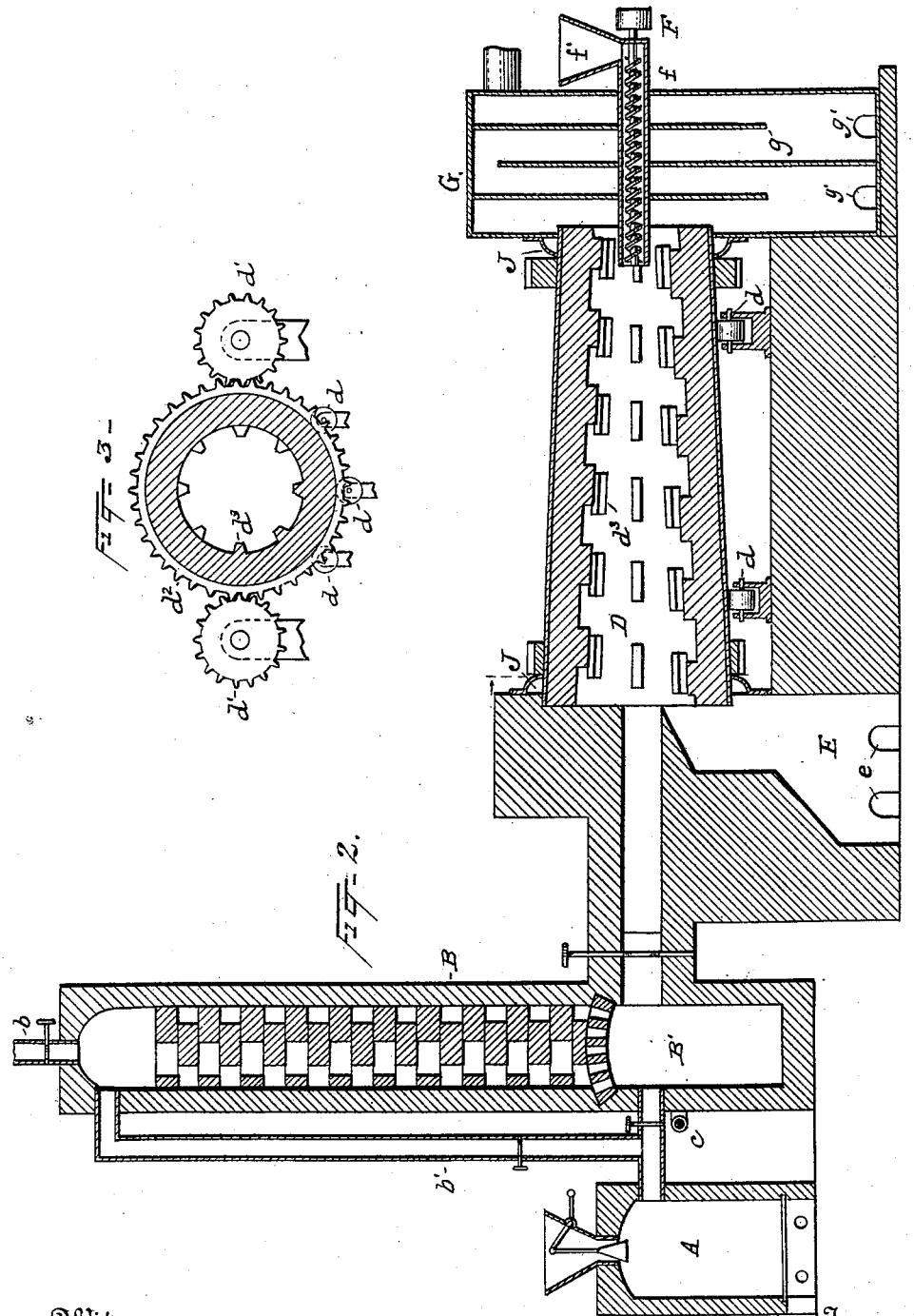

UNITED STATES PATENT OFFICE.

THOMAS B. FOGARTY, OF NEWARK, NEW JERSEY.

APPARATUS FOR MAKING CYANIDS.

SPECIFICATION forming part of Letters Patent No. 615,266, dated December 6, 1898.

Application filed December 18, 1896. Serial No. 616,137. (No model.)

*To all whom it may concern:*

Be it known that I, THOMAS B. FOGARTY, a citizen of the United States, residing at Newark, in the county of Essex and State of New Jersey, have invented a certain new and useful Apparatus for Making Cyanids, of which the following is a specification.

My invention relates to an improved apparatus for the manufacture of cyanids, by which the processes for manufacturing said cyanids can be carried on economically and effectively.

In the drawings, where similar letters of reference denote corresponding parts, Figure 1 shows a plan view of a simple form of my apparatus. Fig. 2 shows a longitudinal section taken on the line 1 1 of Fig. 1. Fig. 3 shows a cross-section of the revolving retort and connected parts.

Producer-gas is formed in the furnace A by the partial combustion of carbonaceous fuel. It is heated to its highest practicable point on passing down through the superheaters B into the chamber C before it finally enters the cyanizing-retort D. The superheaters B B can be heated up by allowing the producer-gas to flow through the pipe $a$ into the superheater, where, meeting a quantity of air, further combustion takes place, the products passing out through the flue or chimney $b$. After the superheater is heated the gases are drawn through the pipe $b'$ and down through B without meeting additional air until arriving at the chamber B'. The passage of the gas through the heated checker-work of the superheater raises it to a high temperature. The air, which is admitted in adjusted quantities into B' through the pipe $c$, is preferably previously heated in one of the air-superheaters C' C', which are similar to B B, having a separate furnace $c'$, with proper chimney $c^2$ and flues $c^3$ $c^3$ to admit air, which is heated to continuously supply hot air to the chambers B'. Fig. 1 shows how, by using the various pairs of heaters alternately, the cyanizing process can be made continuous and the products put into the cyanizing-retort D at the highest possible temperature.

The producer-gas meets a sufficient quantity of air in the chamber B' to attain the required temperature by further combustion. The air supplies the nitrogen, which is freed from the presence of its accompanying oxygen by the going into combination of the oxygen with the carbon to form carbon monoxid and carbonic-acid gases. The highly-heated gases pass into the revolving retort D, where they meet with a mixture of an alkali or alkaline compound and a carbonaceous material, the mixture being fed in at the other end by any appropriate means, such as shown by the feeding-screw F, working in the pipe $f$, having a hopper $f'$, in which to put the mixture. By means of this retort a very complete and intimate contact is established between the gases therein and the alkali-carbon mixture. The carbon immediately reduces what carbonic acid comes into the retort with the gases to carbon monoxid. The alkaline metal is set free and combines with the cyanogen formed by the carbon and nitrogen to form alkaline cyanids. These reactions take place at a temperature preferably between 2,000° and 2,300° Fahrenheit. The chamber G, fitted with dust-catching screens $g$, is provided at the end of the retort, in order to catch the products which are in such a fine state as to be carried through the retort by the gases, which finally escape through the opening H. The apertures $g'$ are provided for the purpose of effecting the removal of the solid material, which may collect in the chamber G. The main part of the solid products of the reaction is carried through the retort and dropped into the chamber E, whence it may be removed through the apertures $e$ $e$ and the cyanids extracted from the by-products by any of the well-known methods.

I will now particularly describe the revolving retort D. This may be cylindrical, though it is shown in the shape of a truncated cone. It is borne upon the rollers $d$ $d$ $d$, which serve to support its heavy weight, while allowing it to revolve with the least possible amount of friction. Though other methods may be employed to revolve this cyanizing-retort, I prefer to use cog-wheels $d'$ $d'$, whose teeth mesh in racks $d^2$, which extend around the periphery of the retort. The parts are made of sufficient strength to bear the weight of the retort, which may have a metal sheath, but which has its interior lined with a substance which will withstand and retain the tremendous heat to which the substances within it are subjected. The interior of the retort has projecting blocks $d^3$ so arranged and so shaped that in the revolution of the retort they will carry portions of the pulverized mixture up to a certain height and let it drop down through the gas. They are preferably so arranged, too, that they will carry the mixture slowly through the length of the retort to be finally deposited in the chamber E. The junction of the retort D with the immovable parts of the apparatus is made tight by means of the annular chambers J J, which surround the retort at its ends and which are kept filled with gas, preferably the waste gases coming from the pipe H. This prevents the entrance of cold or deleterious gases into the retort. By means of this retort I effect a very intimate contact of the alkali-carbon mixture with the producer-gas. Particles of the gases are imprisoned in the interior of the alkaline mass by the falling solid material, thus by close and continued contact greatly promoting the desired reactions. As D revolves fresh portions of the mixture are constantly being brought to the surface. The slow movement of the mixture through the retort allows, if desired, fresh increments of the alkaline-carbon mixture to be added or allows the process to be carried on continuously. It will be seen that the scale upon which the process can be carried on is limited only by the size of the retort.

What I claim is—

1. In an apparatus for carrying out a process for making cyanids, the combination of a producer for making producer-gas, an air-heater for supplying hot air to such gas, a superheater for increasing the temperature of such gas as it comes from the producer, a mixing-chamber for mixing the heated air and producer-gas, a revoluble retort containing carbon and alkali connected with said mixing-chamber, and chambers for collecting the products of the reactions, for the purposes substantially as set forth.

2. The combination with a revoluble cyanizing-retort in which the solid material is contained and through which a gas is directed into contact with such material, the said retort being provided on its interior with a plurality of separate projections for agitating the solid material, such projections being non-continuous longitudinally and provided with inclined faces for moving the material slowly toward one end of the retort, of means for feeding the material into the interior of the retort, and means for supporting and rotating the retort, substantially as set forth.

3. In a cyanidizing apparatus, the combination with a stationary gas-producing apparatus and a stationary air-heater, of a revolving retort connected to said gas-producer and air-heater and to which solid material is supplied, substantially as set forth.

4. In a cyanidizing apparatus, the combination with a stationary gas-producer and a stationary air-heater, of a revoluble retort connected to said producer and heater, and a mixing-chamber between said retort and the heater, substantially as set forth.

5. In a cyanidizing apparatus, the combination with a stationary gas-producer and a stationary air-heater, of a revolving retort connected to said producer and heater and to which solid material is supplied, a mixing-chamber between the retort and the heater, and a refuse-chamber connected to the revolving retort beneath the mixing-chamber, substantially as set forth.

This specification signed and witnessed this 15th day of December, 1896.

THOMAS B. FOGARTY.

Witnesses:
 EUGENE CONRAN,
 GEORGE P. DYER.